United States Patent
Lim et al.

(10) Patent No.: US 9,337,884 B2
(45) Date of Patent: May 10, 2016

(54) MEDIUM ACCESS CONTROL METHOD IN SINGLE CHANNEL WIRELESS NETWORK ENVIRONMENT

(71) Applicant: GWANGJU INSTITUTE OF SCIENCE AND TECHNOLOGY, Gwangju (KR)

(72) Inventors: Hyuk Lim, Gwangju (KR); Wooyeol Choi, Gwangju (KR); Jaeseon Hwang, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 100 days.

(21) Appl. No.: 14/030,213

(22) Filed: Sep. 18, 2013

(65) Prior Publication Data

US 2015/0078213 A1   Mar. 19, 2015

(51) Int. Cl.
| | |
|---|---|
| H04L 5/14 | (2006.01) |
| H04B 1/50 | (2006.01) |
| H04L 1/18 | (2006.01) |
| H04W 74/08 | (2009.01) |

(52) U.S. Cl.
CPC .. *H04B 1/50* (2013.01); *H04L 1/18* (2013.01); *H04W 74/0816* (2013.01)

(58) Field of Classification Search
CPC ......... H04L 5/14; H04L 5/1438; H04L 25/22; H04L 5/0055; H04W 74/002; H04W 28/04; H04W 84/12; H04B 1/50

USPC .................................................. 370/276, 278
See application file for complete search history.

(56) References Cited

U.S. PATENT DOCUMENTS

| | | | | |
|---|---|---|---|---|
| 7,817,614 | B2 * | 10/2010 | Yang | H04L 27/0012 370/346 |
| 8,325,753 | B1 * | 12/2012 | Bharghavan et al. | 370/431 |
| 8,400,959 | B2 * | 3/2013 | Doi | H04W 56/001 370/324 |
| 8,681,612 | B2 * | 3/2014 | Wentink | 370/230 |
| 2005/0147023 | A1 * | 7/2005 | Stephens et al. | 370/203 |
| 2005/0165950 | A1 * | 7/2005 | Takagi | H04L 12/413 709/236 |
| 2007/0002814 | A1 * | 1/2007 | Benveniste | 370/338 |
| 2007/0086346 | A1 * | 4/2007 | Wentink | 370/236 |
| 2007/0115853 | A1 * | 5/2007 | Wentink | 370/252 |
| 2009/0238132 | A1 * | 9/2009 | Nabetani et al. | 370/329 |
| 2010/0074277 | A1 * | 3/2010 | Nishibayashi | H04W 99/00 370/474 |
| 2013/0163575 | A1 * | 6/2013 | Pak | H04W 74/00 370/338 |
| 2014/0078940 | A1 * | 3/2014 | Aggarwal | H04L 1/1854 370/278 |

* cited by examiner

*Primary Examiner* — Chandrahas Patel
*Assistant Examiner* — Lan Huong Truong
(74) *Attorney, Agent, or Firm* — Hauptman Ham, LLP

(57) ABSTRACT

Disclosed herein is a medium access control method in a single channel wireless network environment, which is a medium access control method of a receiving side terminal capable of communicating in a full-duplex communication scheme. The medium access control method includes: receiving a frame header of a data frame; and transmitting an ACK frame in response to the frame header.

8 Claims, 4 Drawing Sheets

MEDIUM ACCESS CONTROL METHOD IN SINGLE CHANNEL WIRELESS NETWORK ENVIRONMENT

BACKGROUND

1. Technical Field

The present invention relates to a medium access control method in a single channel wireless network environment. More particularly, the present invention relates to a medium access control method of a terminal capable of communicating in a full-duplex communication scheme in a single channel wireless network environment.

2. Description of the Related Art

In conventional wireless network environments, although all nodes are capable of communicating bi-directionally, only half-duplex communication, these nodes can transmit and receive data using only a half-duplex communication scheme, through which data can be transmitted or received only in one direction at a time. That is, a node may receive data transmitted from another node only after finishing transmission. If a node starts transmission and reception simultaneously, both transmission and reception fails due to collision. However, full-duplex communication that can simultaneously transmit and receive data through two channels is made possible. For example, since a cellular phone uses a full-duplex communication scheme, a user may speak while listening to a counterpart, unlike a transceiver. However, existing full-duplex communication is allowed only when a plurality of channels is provided for transmission and reception of data.

However, as signal processing techniques and antenna techniques have advanced recently, a self-interference cancellation technique which allows simultaneous transmission and reception of data using two or more antennas has been developed recently. The full-duplex communication scheme using a plurality of antennas is a new technique using only one channel, unlike existing methods of using a plurality of channels, and it is difficult to combine an existing medium access control (MAC) method with the full-duplex communication scheme. Therefore, there is a need for a medium access control method appropriate for a single channel wireless network environment using a full-duplex communication scheme.

BRIEF SUMMARY

It is an aspect of the present invention to provide a medium access control method which can maximize efficiency of full-duplex communication in a single channel wireless network environment using a full-duplex communication scheme.

As described above, full-duplex communication can be accomplished through a single channel with a plurality of antennas using a self-interference cancellation technique. The most outstanding feature of full-duplex communication is that transmission and reception can be simultaneously performed. In an existing wireless network system using a single antenna, transmission and reception cannot be performed simultaneously, and it is only possible to divide time into very short time units and perform transmission or reception at an allotted time. This is the reason why, while a signal is transmitted through a single antenna, another signal cannot be received through the same antenna. Since a signal transmitted through a wireless medium cannot be received during transmission of a signal due to such a constraint, a variety of problems such as a hidden node problem can occur, and since data transmitted from a plurality of nodes frequently collide with each other, thereby degrading performance of a wireless network.

Theoretically, since a full-duplex communication scheme may simultaneously perform both transmission and reception, the overall performance of a wireless network employing full-duplex communication appears to be double that of a wireless network employing half-duplex communication. However, this is allowed only in ideal cases. For example, when there are two nodes and both nodes transmit data to a counterpart while receiving data transmitted from the counterpart, theoretical performance is double that of half-duplex communication. However, such an ideal case is uncommon in a real wireless network, and considerably irregular and diverse situations occur. Therefore, there is a need for a medium access control method for efficiently using limited channel resources in consideration of diverse situations.

In accordance with one aspect of the present invention, there is provided a medium access control method in a single channel wireless network environment, which is a medium access control method of a receiving side terminal capable of full-duplex communication and includes: receiving a frame header of a data frame; and transmitting an acknowledgement (ACK) frame in response to the frame header.

The transmitting an ACK frame may be performed while the data frame is received.

The transmitting an ACK frame may be performed both if a destination of the frame header is the terminal and if the destination of the frame header is not the terminal.

A network allocation vector (NAV) value may be contained in the ACK frame.

The method may further include receiving the data frame when a destination of the frame header is the terminal.

The method may further include transmitting a NACK frame if reception of the data frame fails.

In accordance with another aspect of the present invention, there is provided a medium access control method in a single channel wireless network environment, which is a medium access control method of a transmitting side terminal capable of full-duplex communication and includes: receiving an ACK frame; setting a NAV of the terminal based on a NAV value contained in the ACK frame; and performing carrier sensing when the set NAV expires.

The receiving an ACK frame may be performed if a carrier is in an idle state as a result of the carrier sensing.

The method may further include performing random backoff if the set NAV expires and a carrier is in an idle state as a result of the carrier sensing; and transmitting data after performing the random backoff.

The method may further include stopping transmission of the data if a NACK frame is received while transmitting the data.

According to the medium access control method, data may continue to be transmitted although the ACK frame is received while transmitting the data.

In accordance with still another aspect of the present invention, there is provided a medium access control method in a single channel wireless network environment, which is a medium access control method of a receiving side terminal and a transmitting side terminal capable of communicating in a full-duplex communication scheme, and includes: transmitting, by the transmitting side terminal, a frame header and a data frame; receiving, by the receiving side terminal, the frame header; and transmitting, by the receiving side terminal, an ACK frame in response to the frame header.

The transmitting an ACK frame may be performed while the receiving side terminal receives the data frame.

A NAV value may be contained in the ACK frame.

The method may further include transmitting a NACK frame by the receiving side terminal if reception of the data frame fails.

The medium access control method may further include stopping transmission of the data frame by the transmitting side terminal if the NACK frame is received.

According to the present invention, efficiency of full-duplex communication may be maximized in a single channel wireless network environment using a full-duplex communication scheme.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Figure 1:
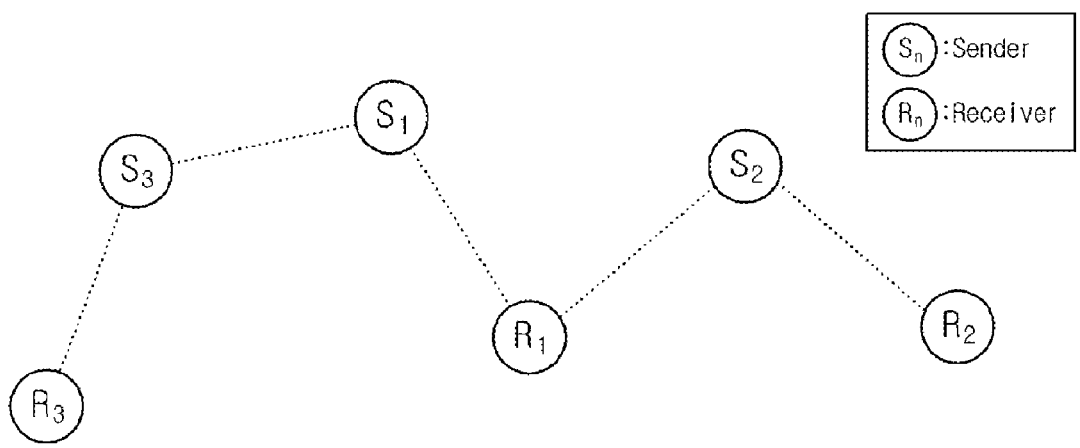
FIG. 1 shows one example of a wireless network environment to which the present invention is applied.

Exemplary embodiments of the present invention will now be described in detail with reference to the accompanying drawings. Like components will be denoted by like reference numerals throughout the specification and the drawings to omit repeated descriptions. In addition, detailed descriptions of details apparent to those skilled in the art will be omitted for clarity.

FIG. 1 shows one example of a wireless network environment to which the present invention is applied. In the wireless network environment, each of nodes ($S_1 \sim S_3$, $R_1 \sim R_3$) transmits data to another node or receives data from the other node through the same single channel. Each of the nodes ($S_1 \sim S_3$, $R_1 \sim R_3$) is a terminal having two or more antennas and capable of full-duplex communication employing a self-interference cancellation technique. Here, it is assumed that nodes $S_1$, $S_2$, $S_3$ desire to transmit data to nodes $R_1$, $R_2$, $R_3$, respectively. A dotted line connected between two nodes shows that both nodes are positioned within a carrier sensing range. For example, since $S_3$ and $S_1$ are connected through a dotted line, $S_3$ and $S_1$ may sense a carrier to each other. However, since $S_1$ and $S_2$ are not connected through a dotted line, these nodes may not sense a carrier to each other.

First, for better understanding of the invention, transmission of data in accordance with the existing IEEE 802.11 protocol in a wireless network as shown in FIG. 1 will be described.

Referring to FIG. 1, if $S_1$ starts to transmit data first, $S_3$ does not transmit data since it can confirm through carrier sensing that the carrier is used by $S_1$. However, since $S_2$ is out of a carrier sensing range from $S_1$, it cannot be confirmed whether $S_1$ is transmitting data through carrier sensing. Here, $S_2$ is referred to as a hidden node. Accordingly, $S_2$ determines that it may transmit its own data. If $S_2$ starts to transmit data, $R_2$ may successfully receive the data from $S_2$. However, due to data transmission of $S_2$, data transmitted from $S_1$ collides with the data transmitted from $S_2$ at $R_1$, so that data transmission from $S_1$ to $R_1$ fails. As a result, only data transmission from $S_2$ to $R_2$ is successfully completed.

Figure 2:
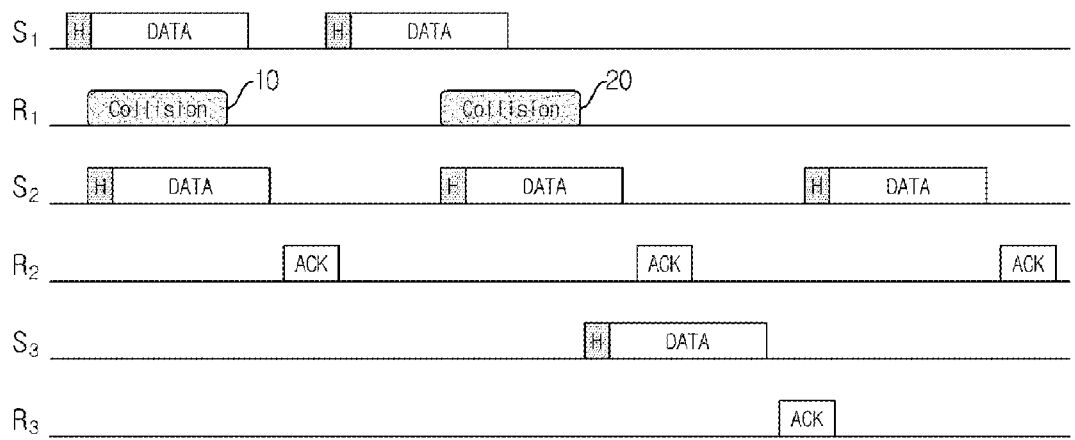
FIG. 2 shows a timing diagram of data transmission in accordance with the existing IEEE 802.11 protocol.

FIG. 2 shows a timing diagram of data transmission described above. Referring to FIG. 2, collision 10 and 20 occurs since $S_1$ and $S_2$ simultaneously transmit data and only data transmission from $S_2$ to $R_2$ is successfully completed. On the other hand, $S_3$ transmits data to $R_3$ through carrier sensing after data transmission of $S_1$ is completed.

Referring to FIG. 1 again, if $S_2$ starts to transmit data first, $S_1$, positioned outside a carrier sensing range from $S_2$, starts to transmit data, and the data transmitted from $S_1$ collides with the data transmitted from $S_2$ at $R_1$. Since $S_1$ does not immediately confirm whether collision occurs, it continues meaningless data transmission, and $S_3$ stands by until data transmission of $S_1$ is completed through carrier sensing. Accordingly, only data transmission from $S_2$ to $R_2$ is successfully completed in the end.

Hereinafter, embodiments of a medium access control method, which can solve the aforementioned problems, maximize data transmission efficiency of nodes using a full-duplex communication scheme, increase the amount of data transmitted per hour, and guarantee fairness among the nodes, will be described.

In the embodiments, each of nodes includes at least two antennas, i.e., a transmit antenna in charge of transmission and a receive antenna in charge of reception, as described above.

A node which desires to transmit data (hereinafter, referred to as a transmitting node) performs carrier sensing and may start data transmission only in an idle state in which a carrier is not used by another node. If the carrier is not in an idle state as a result of carrier sensing, the transmitting node stands by until the carrier enters an idle state while continuously or periodically sensing the carrier. If it is confirmed that the carrier is in an idle state, after a predetermined time (Inter Frame Space, IFS) is elapsed, the transmitting node selects a random backoff value and stands by for a corresponding time in order to avoid collision with another node. Here, the random backoff value is selected to prevent a situation of simultaneously transmitting data by two or more nodes after confirming the idle state, since other nodes existing in the wireless network also confirm the idle state when the carrier enters an idle state. The transmitting node gradually decreases the backoff value, and if the backoff value reaches 0 (i.e., a time corresponding to the backoff value is elapsed), full-scale data transmission is started when a predetermined period of time (Inter Frame Space, IFS) has elapsed. This method is the same as the existing IEEE 802.11 protocol.

A node that desires to receive data (hereinafter, referred to as a receiving node) receives data transmitted on a wireless medium through the receive antenna in a reception standby state. Here, the receiving node receives a frame header positioned at a front section of a data frame, determines whether the corresponding data is transmitted to the receiving node by confirming the destination address contained in the frame header, and continues receiving the data if the data is transmitted to the receiving node. This method is the same as the existing IEEE 802.11 protocol. However, in the existing IEEE 802.11 protocol, if reception of a data frame is successfully completed, the receiving node acknowledges that data transmission has been successfully completed by transmitting an acknowledgement (ACK) frame to the transmitting node as shown in FIG. 2, whereas, in the embodiments of the invention, the receiving node does not perform the process of transmitting an ACK frame after the data transmission is completed.

In one embodiment, if the frame header positioned at the front section of a data frame is received, the receiving node immediately transmits an ACK frame to the transmitting node in response to the data frame. Since a node may communicate based on a full-duplex communication scheme as described above, the ACK frame can be transmitted while the data frame is received. The transmitted ACK frame contains a NAV value indicating a duration of occupying a channel until transmission of the data frame is completed. The NAV value contained in the ACK frame may be determined with reference to the NAV value contained in the frame header. For example, a NAV value to be contained in the ACK frame is determined to correspond to the end point of the duration of occupying a channel, based on the NAV value contained in the frame header. The ACK frame transmitted after receiving the frame header is transmitted both when the data frame is transmitted to the receiving node and when the data frame is transmitted not to the receiving node. That is, the receiving node confirms the destination address of the frame header, and if the data frame is transmitted to the receiving node, the receiving node transmits an ACK frame destined to a corresponding transmitting node (the source address of the frame header) through a transmit antenna and starts to receive the data frame through a receive antenna. Although the corresponding data frame is not a data frame transmitted to the receiving node as a result of confirming the destination address of the frame header, the receiving node transmits an ACK frame destined to a corresponding transmitting node (the source address of the frame header) through the transmit antenna, and reception of data through the receive antenna is stopped.

Furthermore, in one embodiment, if reception fails due to collision, degradation of a channel state, a data transmission error or the like when the data frame is received, the receiving node transmits a negative-acknowledgement (NACK) frame through the transmit antenna. In addition, the receiving node also transmits a NACK frame through the transmit antenna if reception fails due to collision, degradation of a channel state, a data transmission error or the like when a frame header is received. The transmitting node receiving the NACK frame confirms that data transmission has failed.

In one embodiment, the transmitting node changes the receive antenna to a reception standby state when the carrier is in an idle state as a result of carrier sensing and checks whether an ACK frame is received through the receive antenna before data transmission is started. If an ACK frame is received before data transmission is started, this ACK frame is an ACK frame transmitted in response to a data frame (further correctly, an ACK frame transmitted in response to a frame header) transmitted from a node other than the transmitting node, and thus it can be considered that another node is currently transmitting a data frame. This means that another transmitting node and the receiving node occupy the channel. As described above, since a NAV value is contained in the ACK frame transmitted from the receiving node, the transmitting node may know how long another transmitting node and the receiving node will occupy the channel through the NAV value. Thus, the transmitting node maintains the standby state by setting a NAV as long as the duration of occupying the channel by the node that has transmitted the ACK frame with reference to the NAV value in the ACK frame, and when the NAV expires, the transmitting node senses the carrier again and checks whether the carrier is in an idle state.

On the other hand, if the carrier is in an idle state, the transmitting node transmits data through the transmit antenna after performing random backoff when a predetermined period of time (Inter Frame Space, IFS) has elapsed, as described above, while maintaining a state for receiving data by changing the receive antenna to a reception standby state.

In one embodiment, the transmitting node may receive an ACK frame or a NACK frame through the receive antenna while transmitting data (through the transmit antenna). If an ACK frame is received and the ACK frame is an ACK frame transmitted in response to data (more correctly, in response to a frame header) transmitted from the transmitting node as a result of confirming the destination address of the ACK frame, the transmitting node continues data transmission. If the ACK frame is not an ACK frame transmitted in response to the data transmitted from the transmitting node as a result of confirming the destination address of the received ACK frame, collision may occur, and thus data transmission may be stopped. However, since a NACK frame will be received if collision occurs or the collision may not occur owing to the network structure, although the ACK frame is not an ACK frame transmitted in response to the data transmitted from the transmitting node, data transmission need not be stopped. In this case, the transmitting node does not check whether an ACK frame is received or does not decode the ACK frame and confirm the content after data transmission is started through the transmit antenna. If a NACK frame is received through the receive antenna after data transmission is started and the NACK frame is a NACK frame transmitted in response to the data transmitted from the transmitting node as a result of confirming the destination address of the NACK frame, reception of the data fails at the receiving node, and thus the transmitting node stops data transmission and returns to an initial state for transmitting the data again.

Figure 3:
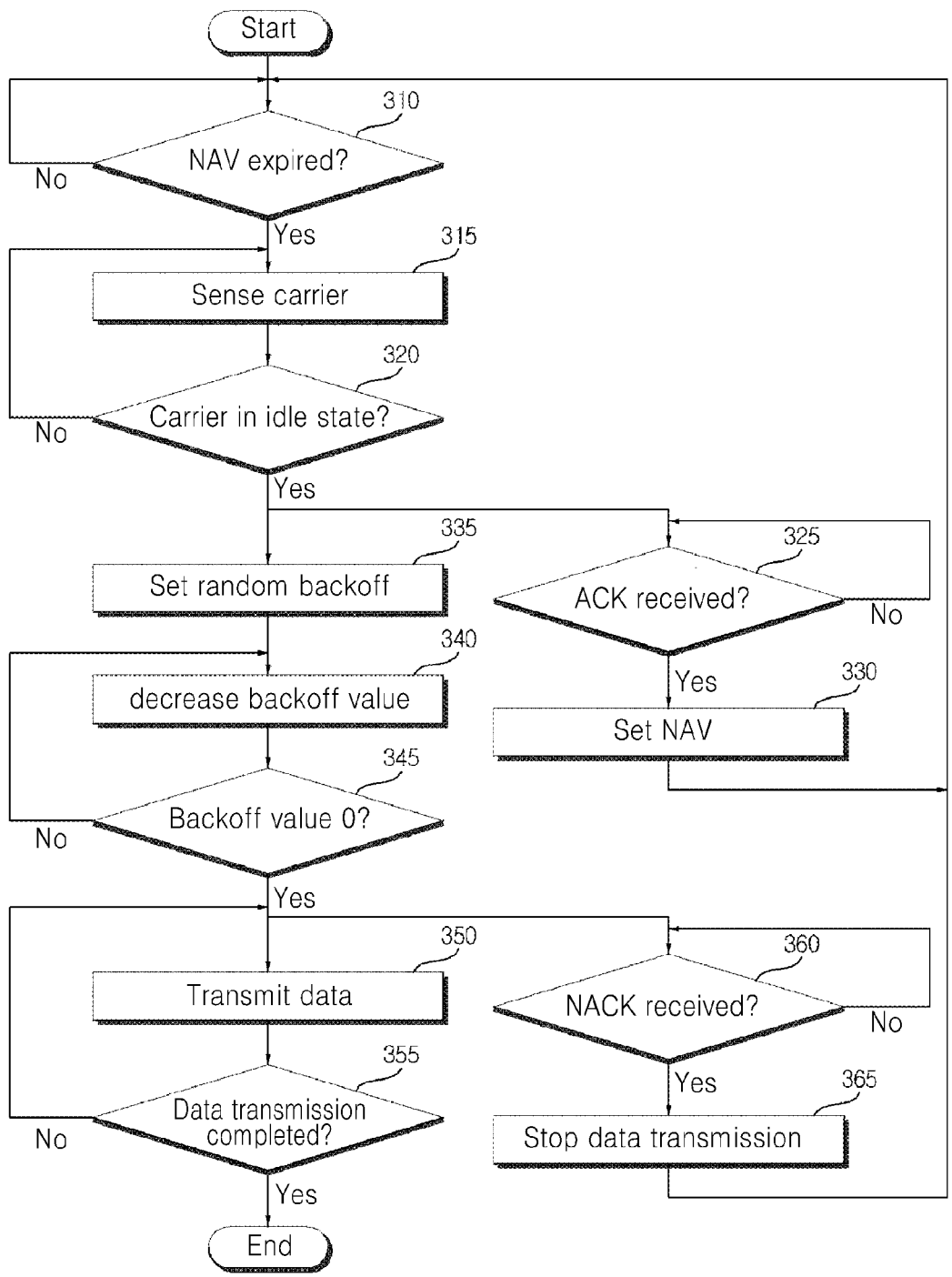
FIG. 3 is a flowchart of a medium access control method in accordance with one embodiment of the present invention, which shows a medium access control method corresponding to a data transmission procedure.

FIG. 3 is a flowchart of a medium access control method in accordance with one embodiment of the present invention, which corresponds to a data transmission procedure.

The transmitting node confirms whether a preset NAV expires (Operation 310) and performs carrier sensing when the NAV expires (Operation 315).

If the carrier is not in an idle state as a result of the carrier sensing (Operation 320), the transmitting node continuously performs carrier sensing.

If the carrier is in an idle state as a result of carrier sensing (Operation 320), the transmitting node sets a random backoff value (Operation 335) and starts to gradually decrease the backoff value (Operation 340). If the backoff value reaches 0 as a result of gradually decreasing the backoff value (Operation 345), the transmitting node starts to transmit data through the transmit antenna (Operation 350). If data transmission is started, a frame header of a data frame is transmitted first and then the data frame is transmitted subsequently. Then, as far as a NACK frame is not received through the receive antenna, data transmission is continued until data transmission is completed (Operation 355).

If the carrier is in an idle state as a result of the carrier sensing (Operation 320), the transmitting node checks whether an ACK frame is received through the receive antenna while the backoff process is performed (Operation 325). If an ACK frame is received through the receive antenna, the transmitting node stops the backoff process, sets a NAV with reference to the NAV value contained in the ACK frame (Operation 330), returns to Operation 310 and stands by until the NAV expires. Operations 325 and 330 are performed until data transmission is started through the transmit antenna in Operation 350. That is, if data transmission is started, the transmit node does not check whether an ACK frame is received.

If data transmission is started, the transmitting node checks whether a NACK frame is received through the receive antenna (Operation 360). If a NACK frame is received through the receive antenna, the transmitting node stops data transmission (Operation 365), returns to Operation 310 again and stands by.

Figure 4:
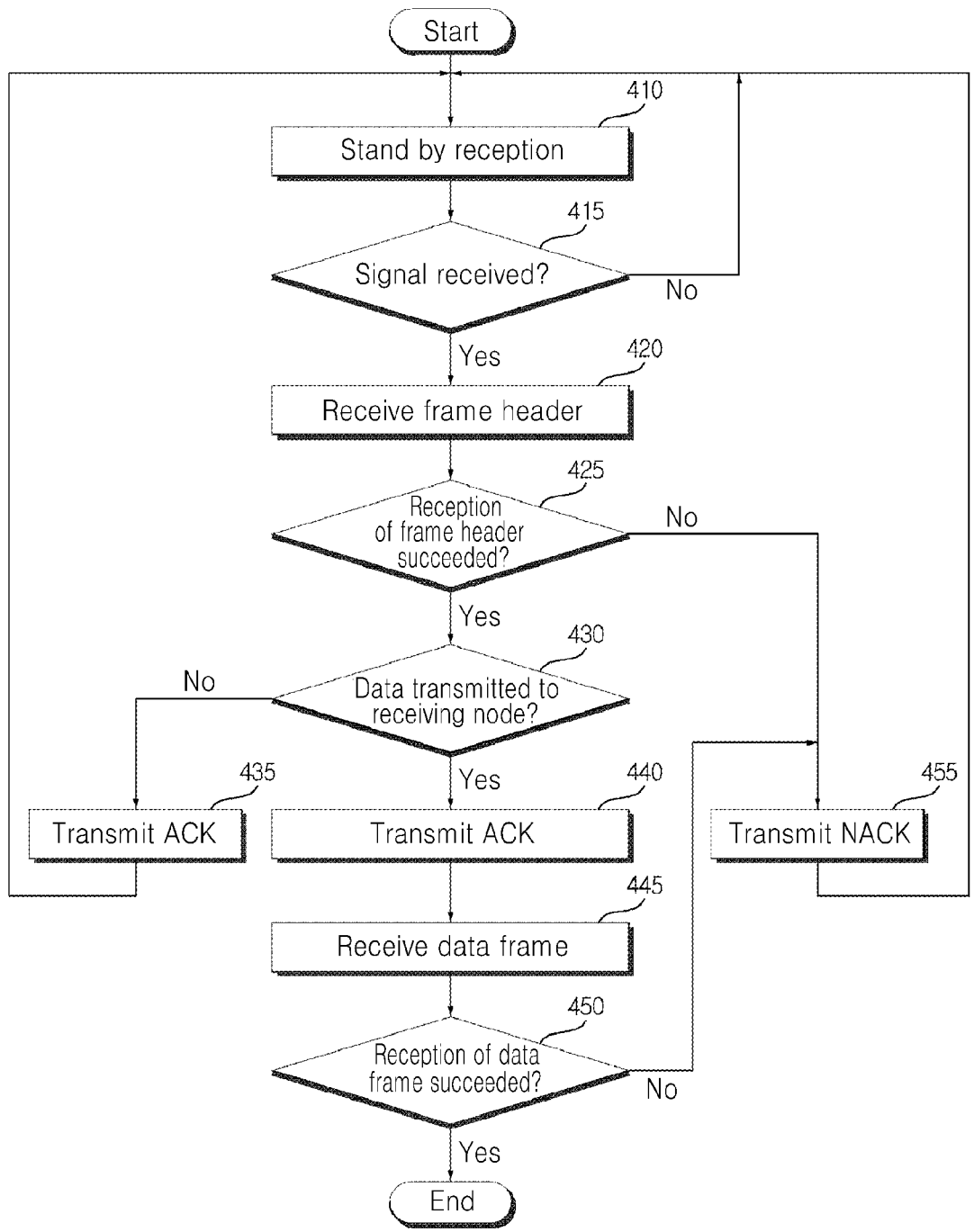
FIG. 4 is a flowchart of a medium access control method in accordance with another embodiment of the present invention, which shows a medium access control method corresponding to a data reception procedure.

FIG. 4 is a flowchart of a medium access control method in accordance with another embodiment, which corresponds to a data reception procedure.

The receiving node keeps the receive antenna in a reception standby state (Operation 410). If a signal is received through the receive antenna (Operation 415), the receiving node first receives a frame header (Operation 420). Here, receiving a frame header includes decoding the frame header received through the receive antenna and confirming content thereof such as a source address and a destination address in the frame header.

If reception of the frame header fails in Operation 425, the receiving node transmits a NACK frame through the transmit antenna using the source address of the frame header as a destination (Operation 455). If the source address of the frame header cannot be confirmed due to failure to receive the frame header, the destination address of the NACK frame is filled with a null value. After transmitting the NACK frame, the receiving node returns to the reception standby state.

If reception of the frame header succeeds in Operation 425, the receiving node determines whether the corresponding data is transmitted to the receiving node by confirming the destination address contained in the frame header (Operation 430). If the corresponding data is not data transmitted to the receiving node, i.e., if the destination address of the frame header does not correspond to the receiving node, the receiving node transmits an ACK frame through the transmit antenna using a node that has transmitted the frame header as a destination (Operation 435) and returns to the reception standby state. If the corresponding data is data transmitted to the receiving node, i.e., if the destination address of the frame header corresponds to the receiving node, the receiving node transmits an ACK frame through the transmit antenna using a node that has transmitted the frame header as a destination (Operation 440) and receives a data frame which follows the header frame through the receive antenna (Operation 445). Although FIG. 4 illustrates that the data frame is received (Operation 445) after the ACK frame has been transmitted (Operation 440), the ACK frame may be transmitted while the data frame is received, as described above. That is, since the receiving node is capable of full-duplex communication, transmission of the ACK frame through the transmit antenna and reception of the data frame through the receive antenna may be simultaneously performed.

If reception of the data frame succeeds, the data transmission procedure is finished. If reception of the data frame fails due to collision, degradation of a channel state, a data transmission error or the like, the receiving node transmits a NACK frame through the transmit antenna using a node that has transmitted the data (the source address of the frame header) (Operation 455) as a destination and returns to the reception standby state.

Now, referring to FIG. 1 again, transmission of data in accordance with one embodiment will be described.

If $S_1$ starts to transmit data first, $S_3$ does not transmit data since it can confirm through carrier sensing that the carrier is used by $S_1$, in the same manner as the existing IEEE 802.11 protocol. As $S_1$ transmits data, $R_1$ receives a frame header from $S_1$, and $R_1$ receiving the frame header transmits an ACK frame in response thereto. After $R_1$ transmits the ACK frame, $S_1$ continues transmitting data, and the ACK frame transmitted from $R_1$ arrives at $S_2$ as well as $S_1$. $S_2$ receiving the ACK frame transmitted from $R_1$ confirms that other transmitting and receiving nodes ($S_1$ and $R_1$) currently occupy the channel, sets a NAV and maintains the standby state while the nodes occupy the channel. Accordingly, transmission of data from $S_1$ to $R_1$ is successfully completed. $S_3$ may transmit data to $R_3$ through carrier sensing while $S_1$ does not transmit data.

Figure 5:
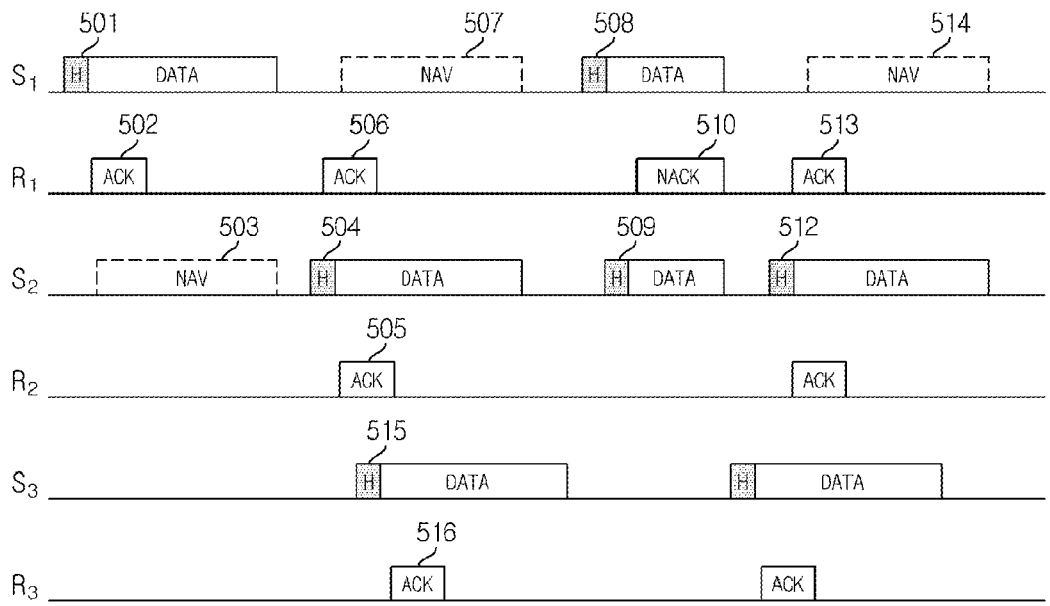
FIG. 5 shows a timing diagram of data transmission in accordance with one embodiment of the present invention.

FIG. 5 shows a timing diagram of the data transmission described above. Referring to FIG. 5, $R_1$ receiving a frame header 501 from $S_1$ transmits an ACK frame 502. Since $S_2$ also receives the ACK frame 502, $S_2$ sets a NAV 503 with reference to the NAV value contained in the ACK frame 502 and maintains the standby state during a time period corresponding to the NAV 503. After the NAV 503 expires, $S_2$ confirms whether the carrier is in an idle state by performing carrier sensing starts data transmission. $R_2$ receiving a frame header 504 from $S_2$ transmits an ACK frame 505. Meanwhile, since the signal transmitted from $S_2$ also arrives at $R_1$, $R_1$ also receives the frame header 504 and transmits an ACK frame 506 in response to the frame header 504. The ACK frame transmitted from $R_1$ arrives at $S_1$ as well as $S_2$ (see FIG. 1). Accordingly, $S_1$ sets a NAV 507 with reference to the NAV value contained in the ACK frame 506 and maintains a standby state during a time period corresponding to the NAV 507.

Further, referring to FIG. 5, both $S_1$ and $S_2$ may determine that the carrier is in an idle state as a result of carrier sensing and transmit data 508 and 509 almost simultaneously. Then, collision occurs at $R_1$. Accordingly, $R_1$ fails to receive the data and transmits a NACK frame 510. Both $S_1$ and $S_2$ receive the NACK frame 510 transmitted from $R_1$ and, thus, stop data transmission currently in progress. Then, either $S_1$ or $S_2$ ($S_2$ in FIG. 5) starts to transmit data through random backoff. $R_1$ receiving a frame header 512 from $S_2$ transmits an ACK frame 513, and $S_1$ receiving the ACK frame 513 sets a NAV 514 and maintains the standby state. Here, $R_2$ successfully receives data from $S_2$.

In addition, as shown, $S_3$ may transmit data to $R_3$ through carrier sensing while $S_1$ does not transmit data. For example, $S_3$ may transmit data 515 while $S_1$ is set to a NAV and stays in a standby state. $R_3$ transmits an ACK frame 516 in response to the frame header of the data 515.

Referring to FIG. 1 again, if $S_2$ starts to transmit data first, $R_1$ receives a frame header from $S_2$ and transmits an ACK frame in response to the frame header. $S_1$ receiving the ACK frame from $R_1$ confirms that other transmitting and receiving nodes ($S_2$ and $R_2$) currently occupy the channel, sets a NAV and maintains the standby state while the nodes occupy the channel. Thus, $S_3$ may confirm that the carrier is in an idle state through carrier sensing and start to transmit data to $R_3$. Accordingly, both transmission of data from $S_2$ to $R_2$ and transmission of data from $S_3$ to $R_3$ are successfully completed.

As such, the present invention improves performance of a wireless network which uses a single channel and improves fairness among nodes by continuously guaranteeing data transmission currently in progress by transmitting an ACK frame in response to reception of a frame header.

Figure 6:
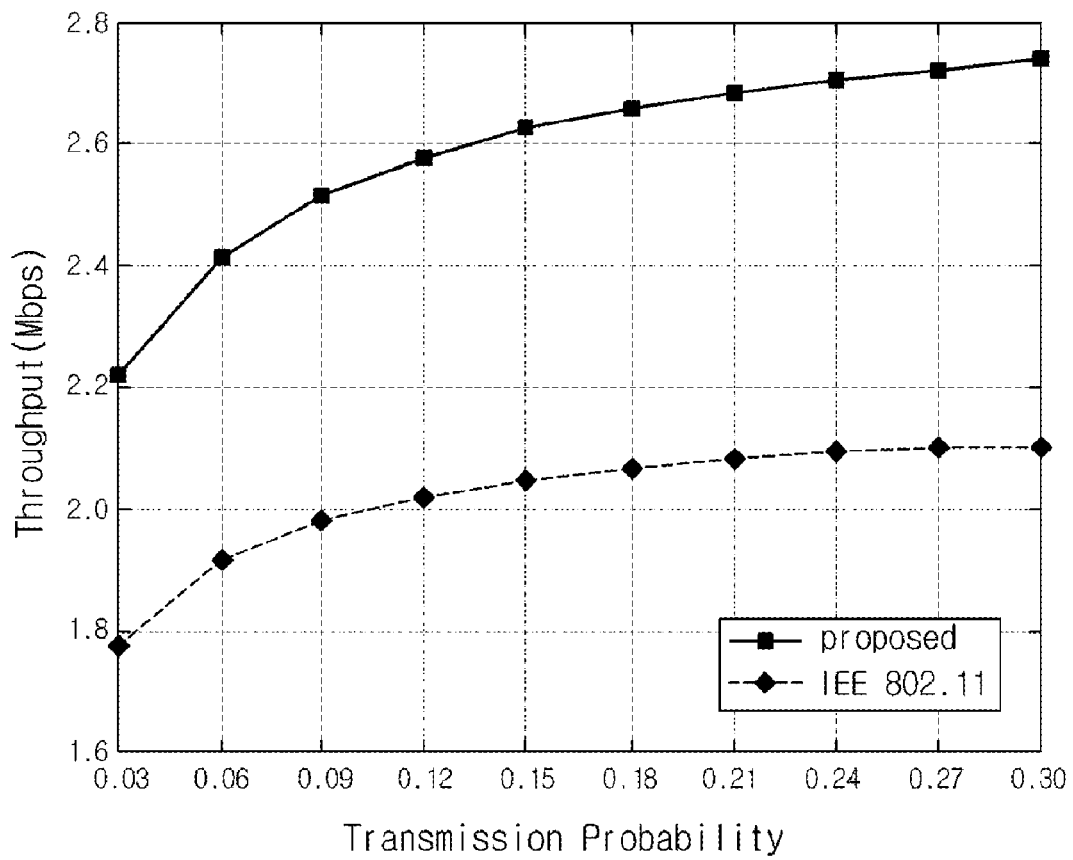
FIG. 6 is a graph comparing transmission performance of one embodiment of the present invention with transmission performance of the existing IEEE 802.11 protocol.

FIG. 6 is a graph comparing transmission performance of one embodiment of the present invention described above with transmission performance of the existing IEEE 802.11 protocol. As can be seen from FIG. 6, the embodiment of the invention improves performance by 30% compared with the IEEE 802.11 protocol.

Although some exemplary embodiments have been described herein, it should be understood by those skilled in the art that these embodiments are given by way of illustration only, and that various modifications, variations and alterations can be made without departing from the spirit and scope of the invention. The scope of the present invention should be defined by the appended claims and equivalents thereof.

What is claimed is:

1. A medium access control method of a terminal capable of full-duplex communication in a single channel wireless network environment, the medium access control method comprising:
   receiving a frame header of a data frame; and
   checking whether the received frame header is destined to the terminal,
      when the received frame header is not destined to the terminal,
         transmitting an acknowledgement (ACK) frame comprising a network allocation vector (NAV) value in response to the frame header, and
         performing a reception standby state;
      when the received frame header is destined to the terminal,
         receiving the data frame and
         transmitting the ACK frame comprising the NAV value,
   wherein the transmitting an ACK frame is performed while the data frame is received.

2. The medium access control method according to claim 1, further comprising: transmitting, when the receiving of the data is failed, a negative-acknowledgement (NACK) frame.

3. A medium access control method of a terminal capable of full-duplex communication in a single channel wireless network environment, the medium access control method comprising:
   receiving an acknowledgement (ACK) frame transmitted in response to a frame header of a data frame;
   setting a network allocation vector (NAV) of the terminal based on a NAV value contained in the ACK frame;
   performing, when the set NAV is expired, carrier sensing;
   performing, when the set NAV is expired and the sensed carrier is in the idle state, random backoff; and
   transmitting data after performing the random backoff,
   wherein the NAV value is configured to indicate a duration of occupying a channel until a transmission of the data frame is completed, and
   wherein, when the ACK frame is received while transmitting the data, the transmitting the data is continued.

4. The medium access control method according to claim 3, wherein the receiving an ACK frame is performed if a carrier is in an idle state as a result of the carrier sensing.

5. The medium access control method according to claim 3, further comprising:
   stopping, when a negative-acknowledgement (NACK) frame is received while transmitting the data, transmission of the data.

6. A medium access control method in a single channel wireless network, environment comprising first and second terminals capable of full-duplex communication, the medium access control method comprising:
   transmitting, by the first terminal, a frame header and a data frame;
   receiving, by the second terminal, the frame header; and
   checking, by the second terminal, whether the received frame header is destined to the second terminal,
      when the received frame header is not destined to the second terminal,
         transmitting, by the second terminal, an acknowledgement (ACK) frame comprising a network allocation vector (NAV) value in response to the frame header, and
         performing, by the second terminal, a reception standby state,
      when the received frame header is destined to the second terminal,
         receiving the data frame and
         transmitting, by the second terminal, an acknowledgement (ACK) frame comprising the NAV value in response to the frame header,
   wherein the transmitting the ACK frame is performed while the second terminal receives the data frame.

7. The medium access control method according to claim 6, further comprising:
   transmitting a negative-acknowledgement (NACK) frame by the second terminal if reception of the data frame fails.

8. The medium access control method according to claim 7, further comprising: stopping, when the NACK frame is received, transmission of the data frame by the first terminal.

* * * * *